United States Patent [19]
Talley et al.

[11] Patent Number: 5,710,380
[45] Date of Patent: Jan. 20, 1998

[54] ANEMOMETER

[76] Inventors: Robert Lee Talley, S. 2221 Eastwood Rd., East Aurora, N.Y. 14052; Theodore Jeffrey Becker, 31 Glendale Dr., Lancaster, N.Y. 14086

[21] Appl. No.: 660,133

[22] Filed: Jun. 7, 1996

[51] Int. Cl.$^6$ ...................................................... G01P 5/06
[52] U.S. Cl. ...................................... 73/861.85; 73/204.22
[58] Field of Search .......................... 73/861.85, 204.22, 73/204.15, 861.95

[56] References Cited

U.S. PATENT DOCUMENTS

| | | | |
|---|---|---|---|
| 2,953,022 | 9/1960 | Laub | 73/204.22 |
| 3,081,628 | 3/1963 | Salera | 73/204.22 |
| 3,922,912 | 12/1975 | Bradbury et al. | 73/861.95 |
| 4,860,583 | 8/1989 | Olson . | |
| 5,339,688 | 8/1994 | Johansson et al. | 73/204.22 |
| 5,413,111 | 5/1995 | Wilkinson . | |

*Primary Examiner*—Richard Chilcot
*Assistant Examiner*—Jewel Arxis

[57] ABSTRACT

An energy-efficient, miniature, hot sensor anemometer designed for battery operation, including an hot airflow sensor, exposed omnidirectionally to the ambient air, for measuring speed of airflow. The anemometer is a subsystem incorporated in a miniature, self-contained environmental monitor. The sensor's electrical resistance changes in relation to the sensor's temperature, and is a function of the ambient air temperature and the speed of airflow to which said sensor is exposed. The anemometer operates in a cyclic mode such that said sensor is preheated, by passing electrical current pulses through it, to a first temperature value above the ambient air temperature, the electrical current flow through said sensor is then terminated, and the sensor, exposed to the airflow, is allowed to cool. The electrical resistance of the sensor changes in response to the cooling of the sensor through convection transfer of its heat to the moving air molecules. A timing circuit is activated at a known second point when the sensor resistance reaches a value corresponding to a certain temperature below the first temperature to which the airflow sensor was preheated. The sensor continues to be cooled by the airflow until its resistance reaches another certain resistance value, corresponding to a third lower temperature, still above the ambient. A timing circuit is stopped at that instance. The time interval between said second and third resistance values corresponding to the preset higher and lower temperature points of said airflow sensor is measured, and the result is related for a ambient air temperature, used as a factor, to the speed of the airflow. In this cyclic mode of operation the average current drain on the battery is significantly lower than the current drain in conventional continuously operating hot sensor anemometers, thus anemometer can operate over extended periods in a portable mode from small conventional batteries.

11 Claims, 11 Drawing Sheets

ANEMOMETER

The U.S. Government has a nonexclusive, nontransferable, irrevocable paid-up license to practice or have practiced this invention for or on its behalf as provided by the terms of Contract Number DAMD17-92-C-2053 awarded by the U.S. Department of the Army.

FIELD OF THE INVENTION

The present invention relates to apparatus for measuring the speed of airflow, and particularly to an improved hot sensor anemometer which operates in a cyclic mode thereby reducing electrical power consumption thereof and facilitating battery operation.

BACKGROUND OF INVENTION

A need exists for portable instruments to measure airflow, such as wind speed, speed of airflow from furnaces and air conditioners, and for aerodynamic measurements. Two classes of anemometers are now available commercially: those with moving parts interacting with airflow, such as vane, propeller, impeller, and rotating cup anemometers; and those that have no moving parts.

In accordance with the prior art, the latter types of anemometers use airflow sensors, such as hot wire, hot film, and thermistors, that are exposed to the cooling effects of airflow. These sensing elements are incorporated into electrical circuits, typically a Wheatstone bridge, and heated to fixed temperature above the ambient. The amount of electrical current needed to compensate the sensing element for the effect of airflow, so as to maintain the constant, preset temperature of said sensing element, as sensed by its resistance, is related to the air flow speed and can be used to indicate said speed. Because the electric current is continuously flowing through the sensing element and other parts of the circuit, considerably more electrical energy is required to operate this type of anemometer as compared to an anemometer provided in accordance with this invention which operates in cyclic mode wherein pulsed, rather than constant amplitude current is used to energize said sensor.

Generally, anemometers using moving parts do not work well at low wind speeds because of the inertia and friction of the moving mechanical components. In addition, any system that uses moving parts, especially in portable operation, is less reliable than a system with no moving parts. Anemometers with no moving parts have the advantages of being able to measure accurately a wide range of airflow speeds, including very low speeds. They are also more reliable. However, there are disadvantages, especially in portable use, with some of these technologies. Currently available hot-wire and hot-film anemometers require a relatively high amount of power, are not omnidirectional in measuring the airflow, and can be quite fragile. Hot-bead (thermistor) anemometers can be configured to be omnidirectionally sensitive to airflow, are small, but, compared to anemometers provided in accordance with this invention, require a relatively high level of power and thus do not lend themselves to portable operation. Reference may be had to the following patents for examples of thermistor anemometers.

U.S. Pat. No. 4,860,583 discloses a thermistor anemometer incorporating two thermistors connected in a bridge circuit. The bead-like low-mass thermistor is self-heated by passing electrical current through it and is exposed to airflow. Its instantaneous temperature is a non-linear function of the speed of the airflow being monitored. The second thermistor has a much larger mass, thus responds much slower to any variations in the airflow, and is used to continuously monitor the ambient temperature. Its electrical output is used to compensate the output of the smaller bead thermistor and the operation is continuous. The instrument is designed to operate from a 22 to 28 VDC or AC and draws between 4 and 20 mA. It is not designed for operation from low power batteries.

U.S. Pat. No. 5,413,111 describes a thermistor anemometer used for medical purposes to monitor the breath of a patient. Three thermistors are sealed in thin film; the assembly is placed on the face of the patient such that one thermistor is located in the proximity of the patient's mouth, the other two thermistors are located each in the proximity of the nostrils. These three thermistors are cooled in response to the air exhaled or inhaled by the patient. A fourth thermistor, not subject to cooling by the patent's breath, is used to monitor the ambient temperature and generate a compensating electrical signal. This is an anemometer designed for continuous operation and stationary use. It also requires relatively high power in use.

SUMMARY, OBJECTS & FEATURES OF INVENTION

It is a feature of this invention to provide improved, heated sensor anemometers operative in a power-saving cyclic mode, and especially suitable for portable, battery-powered operation.

It is another feature of the invention to provide improved, hot sensor anemometers which require a relatively low amount of power as compared to conventional hot sensor anemometers and, when powered by a small battery they can operate for only relatively long period of time or, if need to operate for more extended periods of time, without necessitating the use of a large and heavy battery, which is not conducive to portable operation.

It is an object of this invention to provide an improved anemometer operating in a cyclic mode, that requires for its operation a much reduced amount of power.

A further object of this invention is to provide an improved anemometer which operates in a cyclic mode thus reducing the magnitude of the average electric current requirement.

Another object of this invention is to provide an improved anemometer of dimensions and weight that make it suitable for incorporation in small size portable apparatus.

A yet further object of this invention is to provide an improved anemometer in which the airflow sensor can be exposed omnidirectionally to flow of ambient air and still provide accurate air flow measurements.

A yet another object of this invention is to provide an improved anemometer in which the airflow sensor is a temperature sensitive electrical device.

A still further object of this invention is to provide an improved anemometer in which an airflow sensor is cyclically preheated to a first preset and known (viz., a certain) temperature above the ambient temperature after which the electrical heating current is turned off.

A still another object of this invention is to provide an improved anemometer in which an airflow sensor is allowed to cool due to the effect of the airflow, to a second preset and known (viz., another certain) temperature above the ambient.

A further object of this invention is to provide an improved anemometer in which an airflow sensor is allowed to further cool due to the effect of the airflow over a time period determined by the speed of the airflow to a third preset and known (viz., a certain) point.

A yet further object of this invention is to provide an improved anemometer which measures the time period for sensor cooling to the third point and automatically relates that time period to the speed of the airflow taking into account the ambient air temperature.

A still another object of this invention is an anemometer which incorporates a computer (preferably MICROPROCESSOR based and referred to herein as a microprocessor and display of airflow speed computed the values of said time period and the ambient air temperature.

A yet further object of this invention is to provide an improved anemometer which is programmable to set the airflow speed range, ambient temperature range, the frequency of cyclic airflow measurements, the upper and lower temperature set points for heating and cooling a temperature sensitive electrical sensor, and to accommodate device-dependent parameters of the and airflow temperature sensors.

Another object of this invention is to provide an improved anemometer which uses a negative temperature coefficient thermistor as its air flow speed sensor.

Another object of this invention is to provide an improved anemometer which uses a positive temperature coefficient thermistor as its air flow sensor.

A further object of this invention is to provide an improved anemometer which can use a wire as airflow sensor.

A yet further object of this invention is to provide an improved anemometer which can use thin film as its airflow sensor.

The invention may obtain one or more, but not necessarily all of the foregoing objects.

Briefly described, an anemometer embodying the invention, (a device for measuring the speed of airflow), is useful in battery-operated, portable mode where low power consumption, small size and low weight are important. The anemometer can be incorporated as a subsystem into a miniature, self-contained environmental monitor that, in addition to airflow, measures the ambient temperature, humidity and solar radiation. The airflow sensor of said anemometer is exposed to the ambient air such that it measures the speed of the airflow from any direction.

The airflow sensor operates in a cyclic, rather than a continuous mode, with the result that the average current drain is significantly lower than that of continuously operated anemometers. In one embodiment of the present invention, a small negative temperature coefficient thermistor is used as the airflow sensor. During a single measurement cycle the thermistor is heated by passing pulses of current through it, until it reaches a first temperature above the ambient temperature as measured by the resistance of said thermistor. At this point the heating current is terminated and the thermistor, being exposed to the airflow, cools and its resistance changes accordingly. As this resistance reaches a certain second temperature below the first temperature value, a timing circuit is activated. The thermistor continues to cool until it reaches a certain third lower temperature point at which instant the timing circuit is stopped. The time interval measured between said second and third temperature points is, when a thermistor is used as an airflow sensor, non-linearly related to the speed of the airflow and the temperature of the ambient air. The ambient temperature is measured by a separate thermistor circuit, in which the thermistor is not exposed to the airflow. The ambient temperature is used as a factor in computing the speed of the airflow.

Other airflow sensors, such as use positive temperature coefficient thermistors, hot-wire or hot-film may also be used, in the above described, cyclically operative anemometer, for specific applications of said anemometer, and, which, because of its cyclic operation, also provides significant power saving.

BRIEF DESCRIPTION OF THE DRAWINGS

The present invention will be more fully understood with reference to the following detailed description thereof, when read in conjunction with the attached drawings, wherein like reference numerals refer to like parts and wherein:

FIGS. 1A, B, & C are, respectively, front, side and enlarged (within line 1C—1C) views of an airflow sensor of a hot sensor anemometer, according to the present invention, mounted on the top of the blackened globe used to measure solar radiation in the environmental monitor.

DETAILED DESCRIPTION

Figures 1A, 1B:
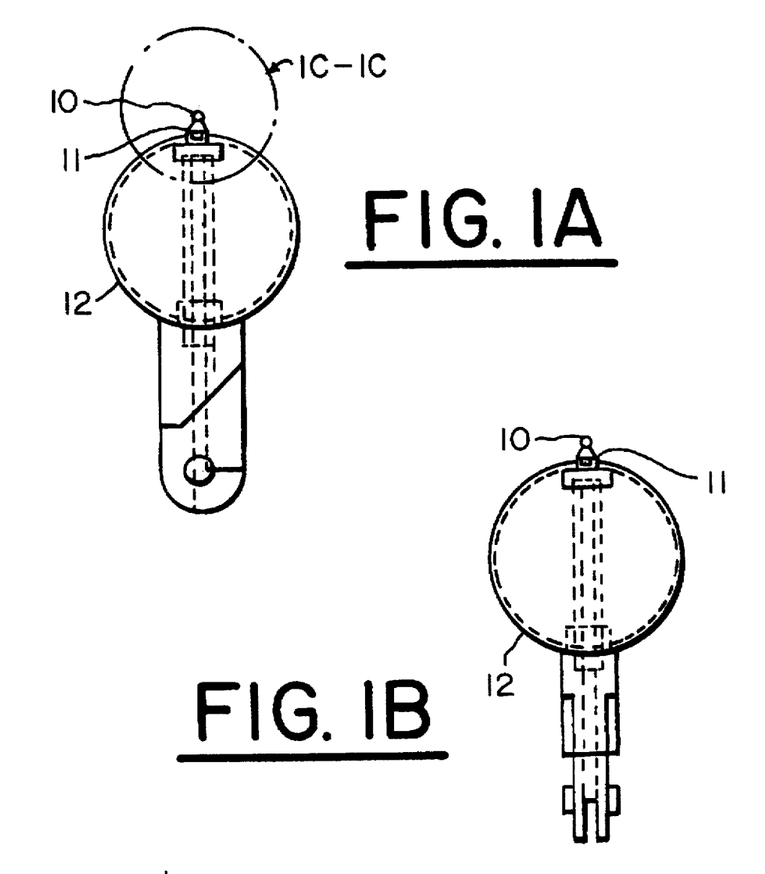
Figure 1C:
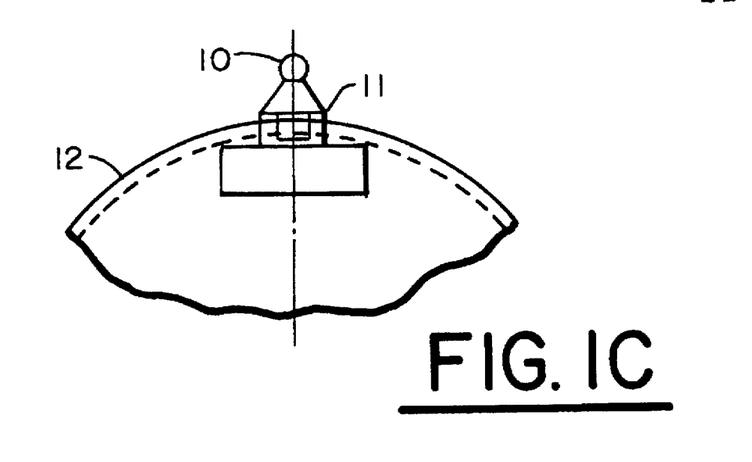

FIG. 1 is a drawing of the airflow sensor 10 mounted on top of a blackened globe 12 that serves to measure solar radiation, one of the four functions of the environmental monitor of which the anemometer provides the airflow speed measuring function. The mounting 11 is designed to support the sensor 10 in such a manner that the sensor is exposed to the airflow from every direction and its response is therefore independent of the direction of the airflow. Another part of said environmental monitor contains a subsystem (not shown) designed to measure the ambient air temperature not affected by the speed of the airflow. In that ambient air temperature subsystem, a temperature sensor is shielded from the airflow, but exposed to the ambient air.

Figure 2:
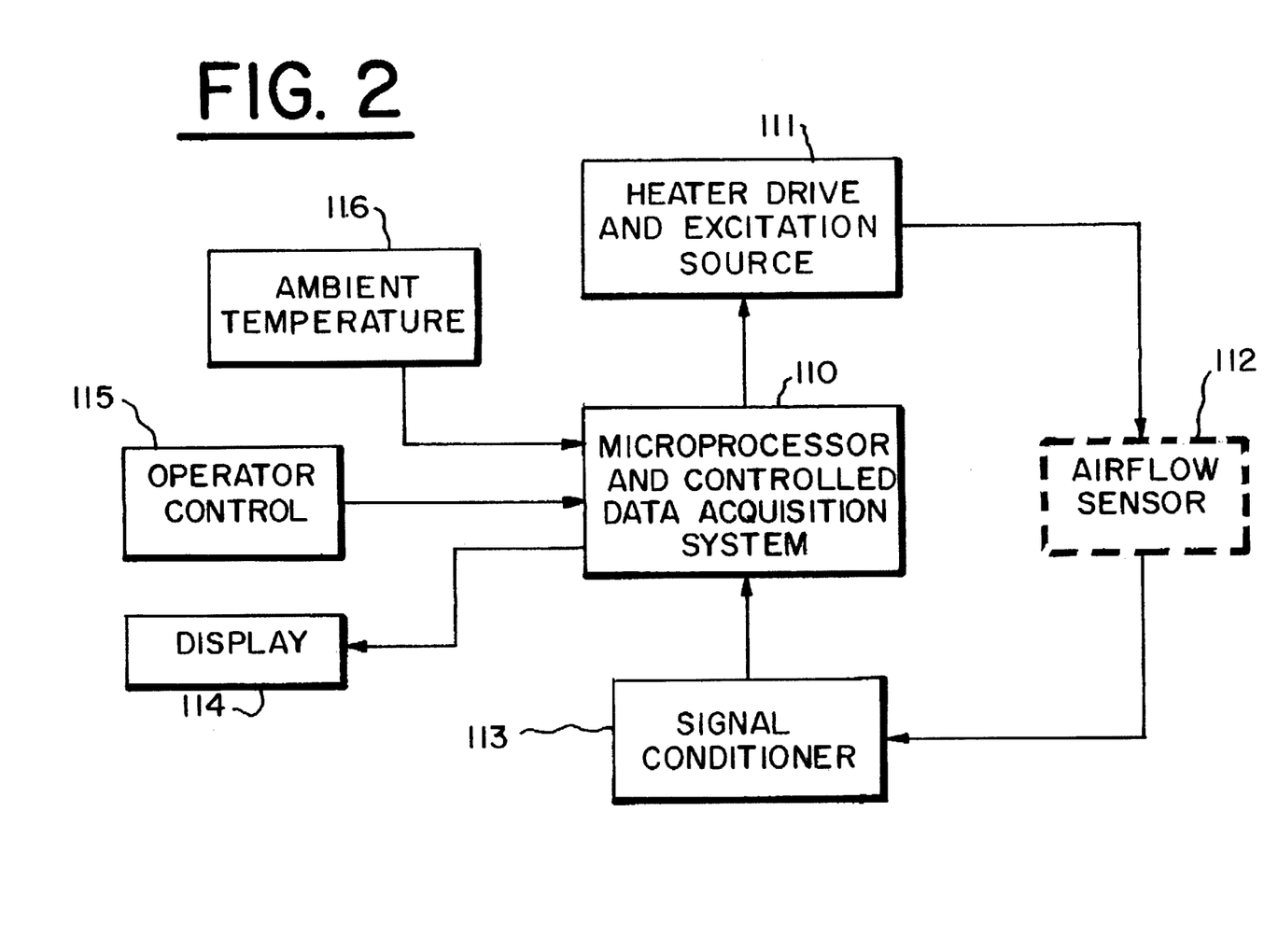
FIG. 2 is a block diagram of the cyclic hot sensor anemometer.

As shown in FIG. 2, the entire operation is controlled by a microprocessor 110 in accordance with a stored program. The program, (see the flowchart, FIG. 10), accommodates speed ranges of airflow, ambient temperature range, the frequency of cyclic airflow measurements, the upper and lower temperature set points for heating and cooling of said airflow sensor, and to accommodate device dependent parameters of said airflow sensor. The program controls the cyclic mode of operation of the system will be apparent from the explanation of the operation thereof contained herein and the flowchart in FIG. 10.

Microprocessor 110 also incorporates a controlled data acquisition system that receives electrical signals from the airflow sensor 112 through a signal conditioner 113. The microprocessor also receives signal corresponding to the reading of the ambient air temperature from the sensor 116.

The airflow speed computed in the microprocessor 110 is indicated on a display 114. An operator can control the various parameters of said apparatus via operator controls 115.

The airflow sensor 112 can be a negative or positive temperature coefficient thermistor, a wire or a thin film deposited on a substrate. The choice of a specific type of said airflow sensor will determine specific operational parameters and component values in the signal conditioner 113 and the heater drive 111. The microprocessor can be programmed to accommodate the different airflow sensors.

Figure 5A:
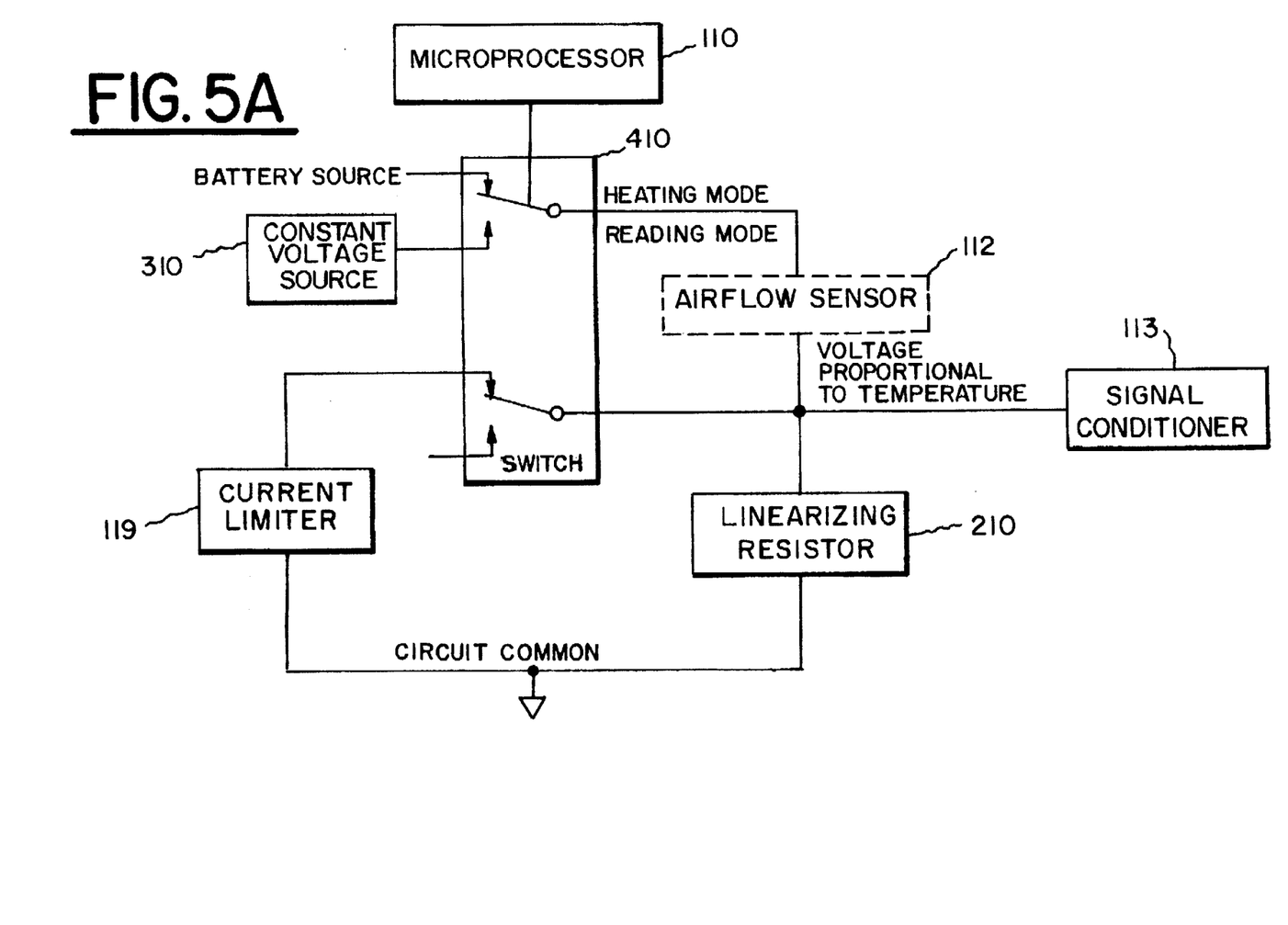
FIG. 5a is a simplified block diagram of the cyclic hot sensor anemometer when a thermistor is used as the airflow sensor element, which diagram is useful in explaining the operation thereof.
Figure 5B:
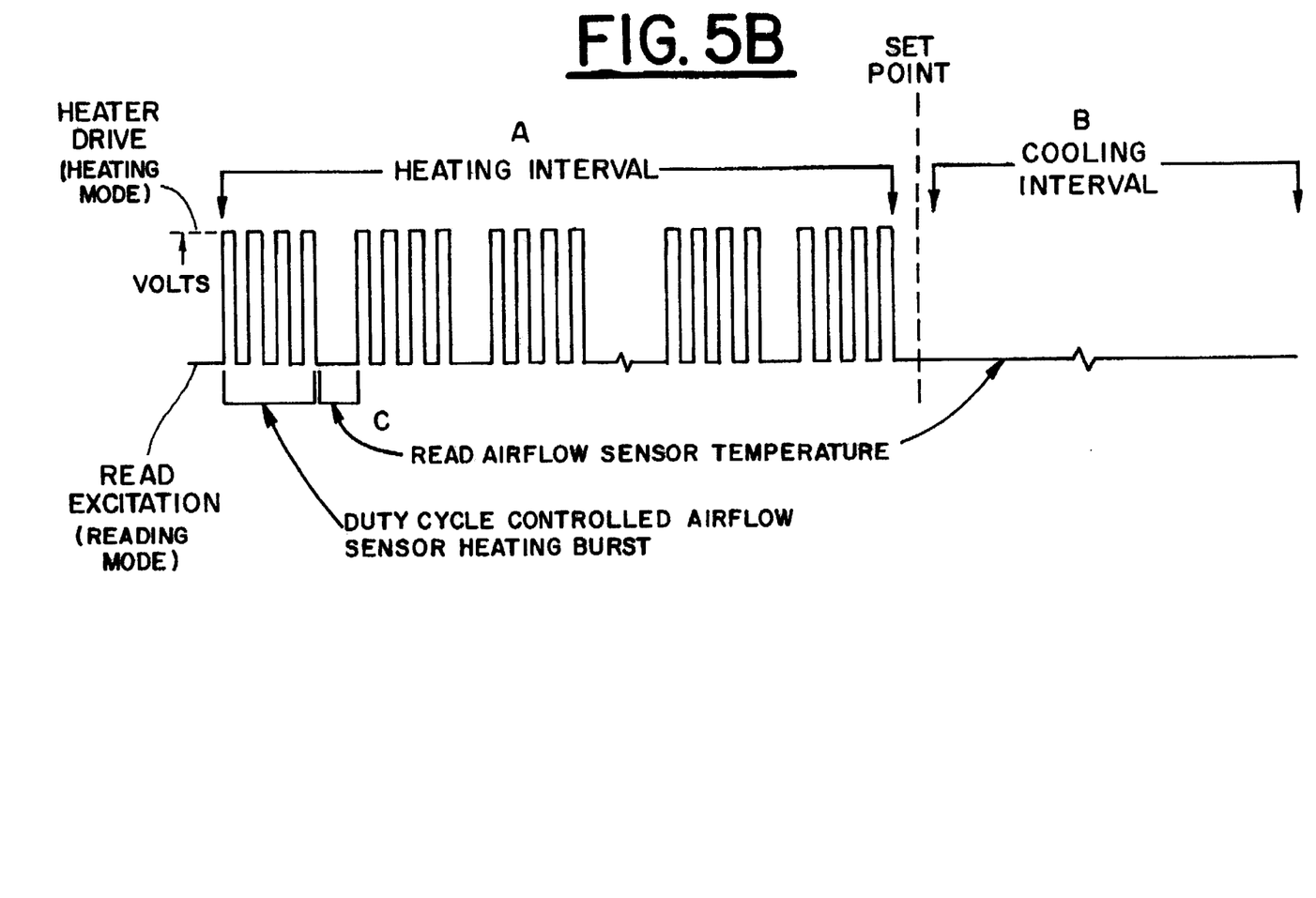
FIG. 5b is a timing diagram of one cycle of the anemometer's operation.
Figure 6:
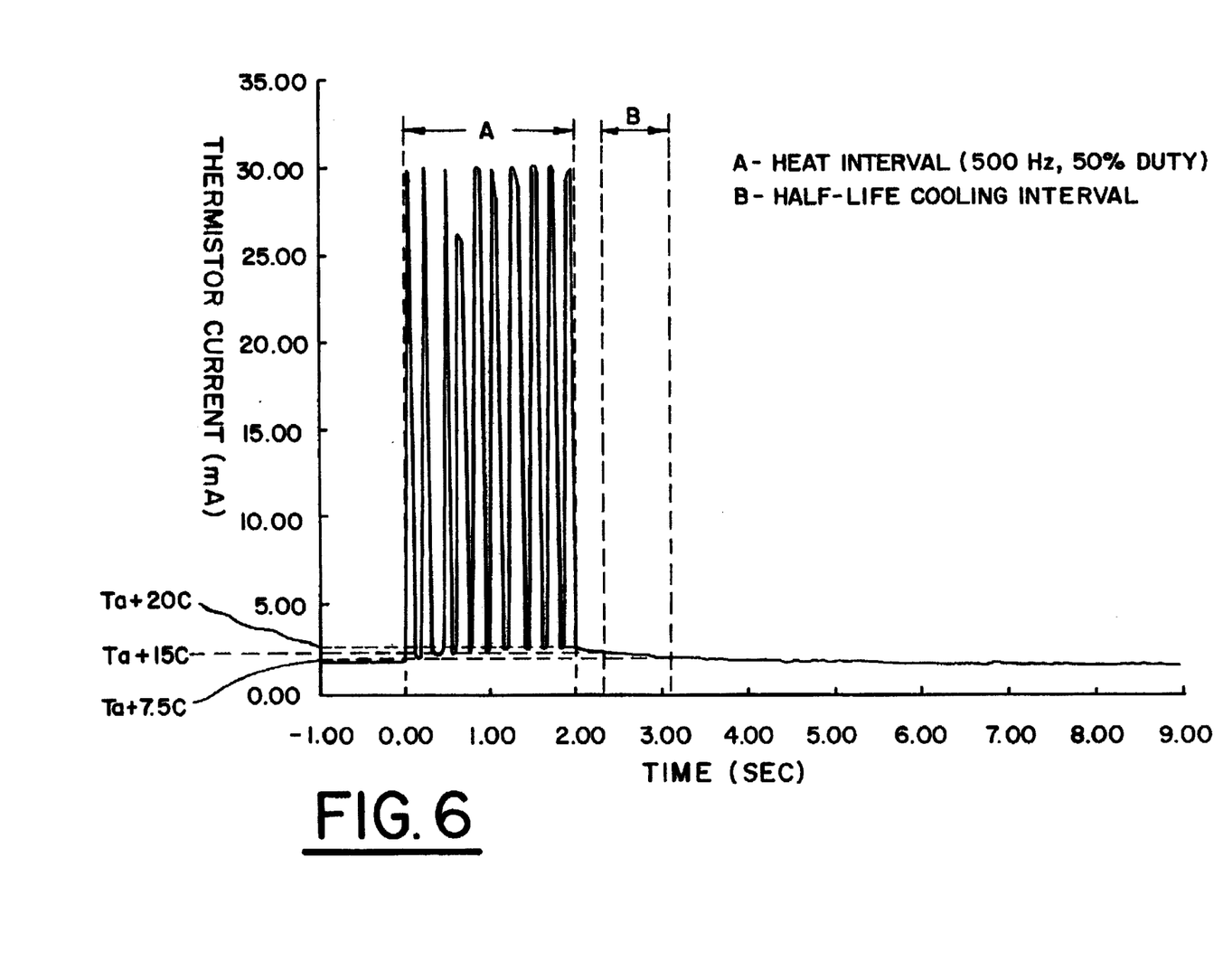
FIG. 6 is a plot showing typical changes during one measurement interval of current flowing through the airflow sensor element, which is a temperature sensitive device, in this case a thermistor.
Figure 7:
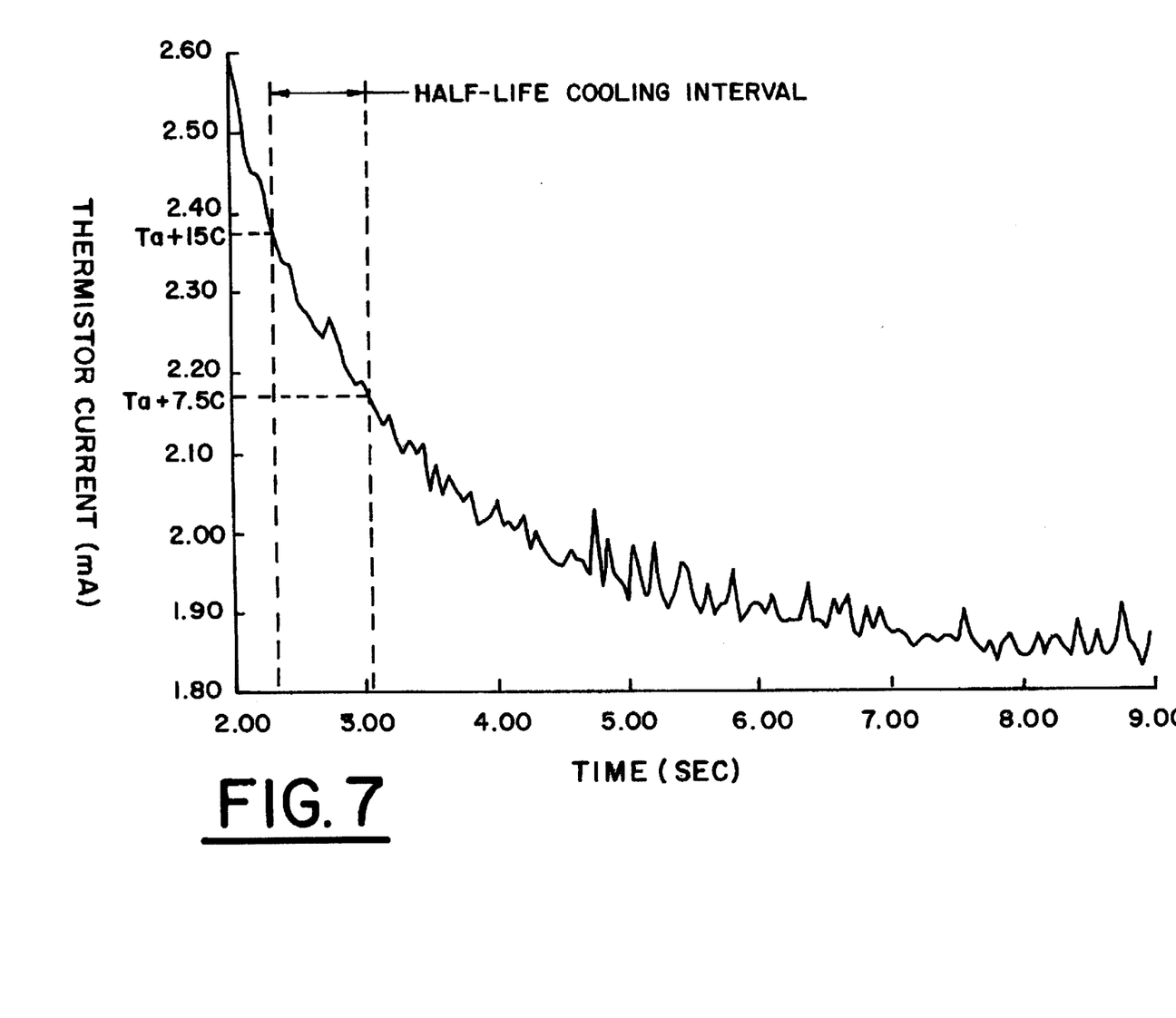
FIG. 7 is a plot of a segment of the diagram depicted in FIG. 5b, illustrating events during the cooling portion of the cycle.

During one cycle of operation of the cyclic anemometer, graphically illustrated in FIGS. 5b, 6 and 7, the heater drive 111 generates, under control of the microprocessor 110, a series of current pulses (FIG. 5b) which are fed into said airflow sensor 112 with the total amount of energy sufficient to raise the temperature of said airflow sensor 112 to above the ambient temperature. Each burst comprises a number of current pulses generated, for example, at a 500 pps repetition rate. The duty cycle, i.e. the on and off time of each individual pulse within a burst, is controlled by the microprocessor 110. As indicated in FIG. 5b, the resistance of said airflow sensor element is measured under control of the microprocessor 110 between each burst. As the resistance value of the airflow sensor begins to approach the desired value that corresponds to the predetermined temperature above the ambient, the duty cycle of the current pulses in a burst is adjusted to lower the average magnitude of the current flowing through the airflow sensor. When the predetermined temperature point is reached, the heating current flow into said airflow sensor 112 is terminated, and the airflow sensor element is allowed to cool at a rate in part determined by the speed of the airflow to which the element is exposed. As it cools, the resistance of said airflow sensor changes and this change is continuously sensed as explained in greater detail below. The electrical signals representing the change in said resistance are processed in the signal conditioner 113 and are inputted to the microprocessor 110 on for controlled data acquisition. The microprocessor uses the acquired data representing the change in resistance of the airflow sensor 112 with time to derive the direct indication (measurement) of the speed of airflow. This measurement is then shown on the display 114.

Figure 3:
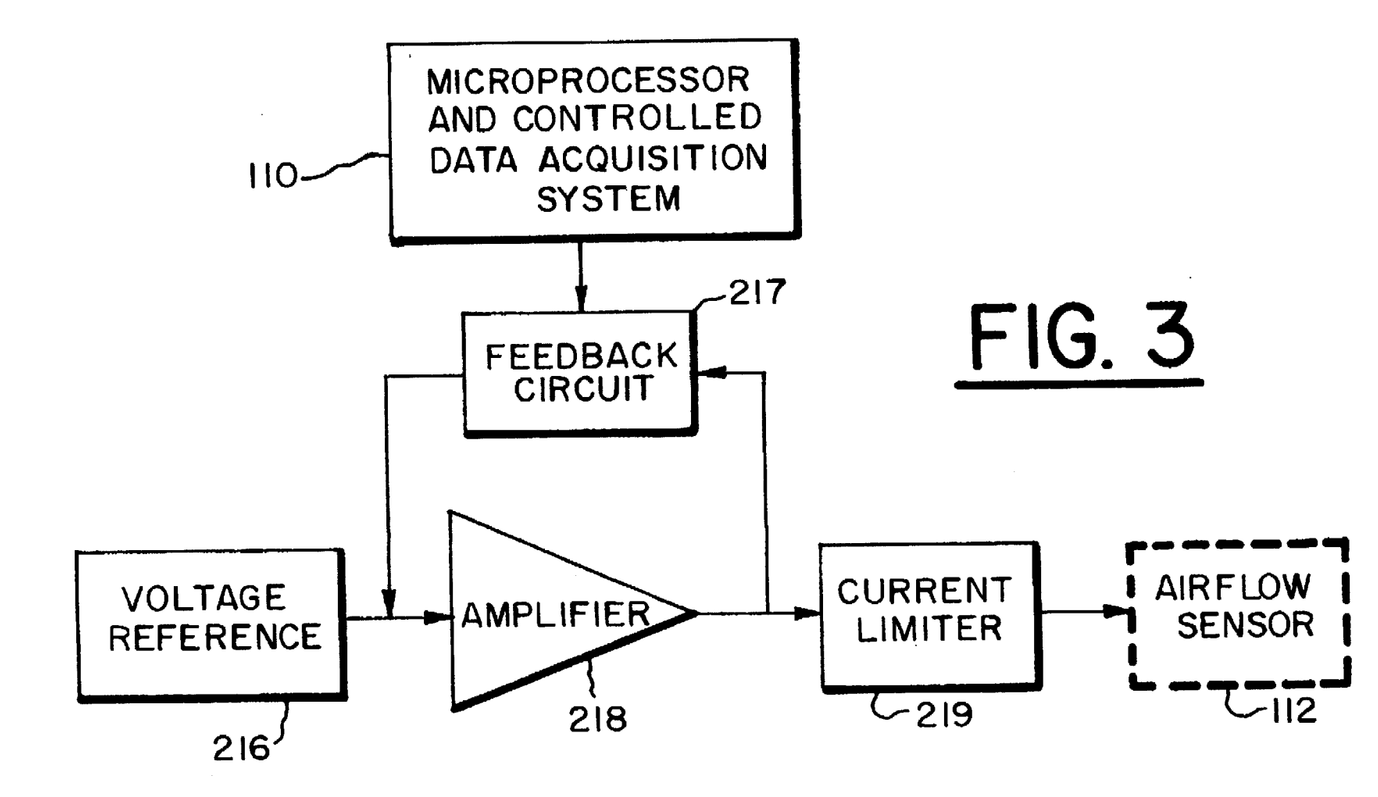
FIG. 3 is a block diagram of the electrical circuit of the heater drive and constant voltage excitation source of the anemometer shown in FIG. 2.

FIG. 3 depicts, in a more detailed block diagram format, the electrical circuit, of block 111 of FIG. 2, used to heat airflow sensor 112. Segment A on the abscissa of the graph in FIGS. 5b and 6 depicts the heating portion of the cycle in terms of current flowing through said airflow sensor as a result of the applied voltage. A constant DC voltage of known value is supplied by the voltage reference 216 and fed into the operational amplifier 218. The feedback circuit 217 is controlled by said microprocessor 110 such that the output of said operational amplifier 218 is a series of pulse bursts, each consisting of a plurality of duty cycle controlled pulses with a repetition rate appropriately higher than the repetition rate of the pulse bursts (FIG. 5b, segment A) that represents the resulting current. As the heating of said airflow sensor proceeds, the duty cycle of the current pulses in a burst gradually changes as the resistance of the airflow sensor increases indicating the approach of the airflow sensor's temperature to the desired predetermined value. The resistance of the airflow sensor is automatically measured between each pulse burst as indicated in FIG. 5b by segments C. Resistance increases with falling temperature for thermistors that have a negative temperature coefficient. Other types of devices used as airflow sensors exhibit different modes of changes in their resistance with changing temperature. For example, positive temperature coefficient thermistors, wire and thin film sensors decrease their resistance with decreasing temperature. These types of responses can be accommodated in the electrical circuits of said cyclic anemometer without altering the basic principle of cyclic, energy-saving operation. During the resistance measurement of the airflow sensor (FIG. 5b, segment C), the microprocessor compares the instantaneous value of said resistance to a stored reference value representing the desired upper value of the temperature of said airflow sensor, and, when the two values are identical, terminates the heating cycle by appropriately controlling said feedback circuit 217. The current limiter 219 determines the maximum magnitude of the heating current allowed to flow into the airflow sensor 112.

Figure 4:
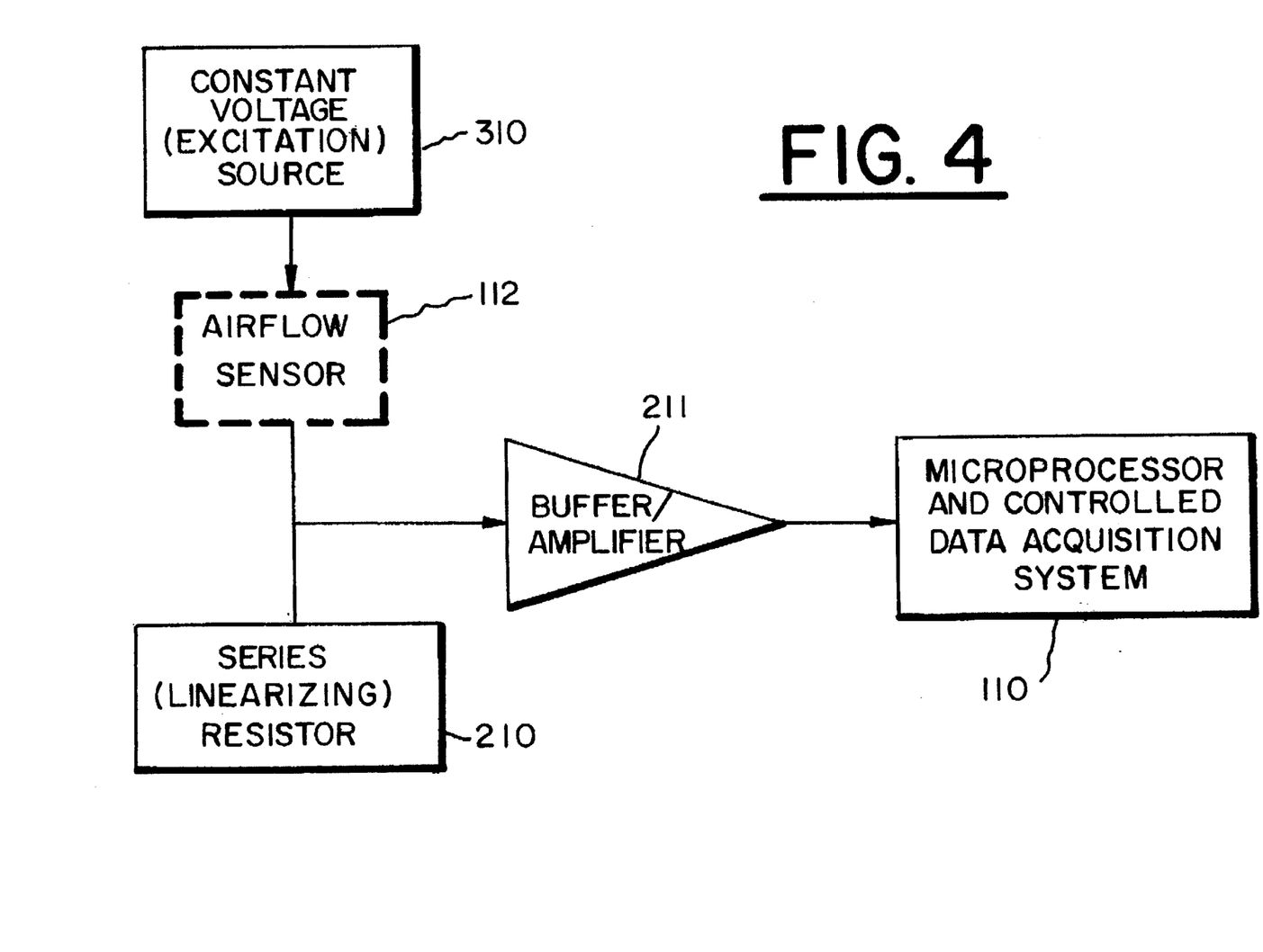
FIG. 4 is a block diagram of the signal conditioner of FIG. 2, shown in the read mode.

FIG. 4 represents, in a block diagram format, the electrical circuit details of block 113 in FIG. 2. As explained above, during the heating portion of the cycle the magnitude of the current flowing through the airflow sensor 112, and therefore the resistance thereof is periodically monitored via the signal conditioner 113 (FIG. 2). During the measurements in the course of the heating cycle and the subsequent cooling cycle, the current flowing through said airflow sensor is reduced to a small fraction of its value during the heating cycle. This reduced current is utilized to measure the change in the airflow sensor's 112 resistance as it cools. A linearizing resistor 210 is connected to said airflow sensor and serves two purposes: it linearizes the output of said airflow sensor with respect to said airflow sensor's temperature, and at the junction with said airflow sensor, it generates a voltage signal that corresponds to the change in resistance over time and, consequently, the temperature of said airflow sensor as it cools. The voltage signal is amplified in a buffer amplifier 211 and is inputted for controlled data acquisition to the microprocessor 110. The airflow sensor's temperature data are interpreted in the microprocessor in accordance with the stored program, and the airflow speed information is computed and then displayed on the display 114 (FIG. 2).

All references in the following explanation with reference to FIGS. 5b, 6, and 7 to specific current and temperature values, responses to changes in temperature, duty cycles, and time intervals are examples, for illustrative purposes only, and they are subject to change depending on the type of airflow sensor employed and the application of said cyclic anemometer.

FIG. 5a is a simplified block diagram illustrating of the operation of the anemometer. The figure shows the connections to the airflow sensor during the heating and the reading modes of operation. During the heating period the airflow sensor 112 is connected through the switch 410 (implemented by gate or switching circuits in the microprocessor or by devices connected to and controlled by the microprocessor) to the heater drive 111. The switch 410 is shown solid for the sake of clarity of description herein as a mechanical device. As indicated, said switch 410 is in the heating mode position. A current limiter 119 prevents from excessive, potentially damaging current to flow through the airflow sensor 112. The microprocessor 110 controls the operation of said switch 410.

In reading mode the airflow sensor 112 is connected through the switch 410 to the read excitation source 310. At the same time switch 410 disconnects the airflow sensor 112 from the current limiter 111, allowing the current through the airflow sensor 112 to flow only through the linearizing resistor 210. A voltage signal proportional to the current passing through the airflow sensor 112 and also proportional to the resistance of said airflow sensor and therefore to its temperature, is generated at the junction between the airflow sensor 112 and the linearizing resistor 210. This voltage signal is input into the signal conditioner 113 and then into the controlled data acquisition system of the microprocessor 110 where this signal is used to compute the speed of the airflow.

FIG. 5b is a timing diagram graphically illustrating one cycle of the operation of the anemometer. As explained earlier, during the heating interval, segment A, bursts of current pulses are passed through the airflow sensor 112. The duty cycles of the pulses are controlled by the microprocessor 110 in relation to the instantaneous value of the airflow sensor's 112 resistance. This resistance is measure during the intervals C and compared to the stored value representing the desired temperature above the ambient of the airflow sensor. When this temperature is reached, the heating cycle is terminated and the reading cycle is initiated during the cooling interval, segment B.

FIG. 6 graphically illustrates one cycle in the operation of the anemometer. During the heating segment A, series of bursts of current pulses heat said airflow sensor 112. The individual pulses within the bursts are not resolved in this figure. The heating portion of the cycle starts at time 0, when the heating current is turned on by said microprocessor 110. The heating portion of the cycle terminates after 2 seconds and the cooling portion commences in which during the time segment B the resistance change of said airflow sensor 112 is measured and related to the speed of the airflow.

FIG. 7 shows a magnified time segment B of the current vs. time curve of FIG. 5b. As said airflow sensor 112 cools, its resistance increases (if a negative temperature coefficient thermistor is used). When at point $T_a+15$ the airflow sensor temperature reaches a value of 15° C. above the ambient temperature, the timing portion of the cycle is initiated by said microprocessor 110. When the temperature of said airflow sensor decreases at point $T_a+7.5$ to 7.5° C. above the ambient, said microprocessor 110 terminates the measuring cycle. The value of the time interval between the points $T_a+15$ and $T_a+7.5$ corresponds to the rate at which said airflow sensor is cooling due to the flow of air past it. From this measured rate of cooling, using the stored program, microprocessor computes and displays the speed of the airflow.

Figure 8:
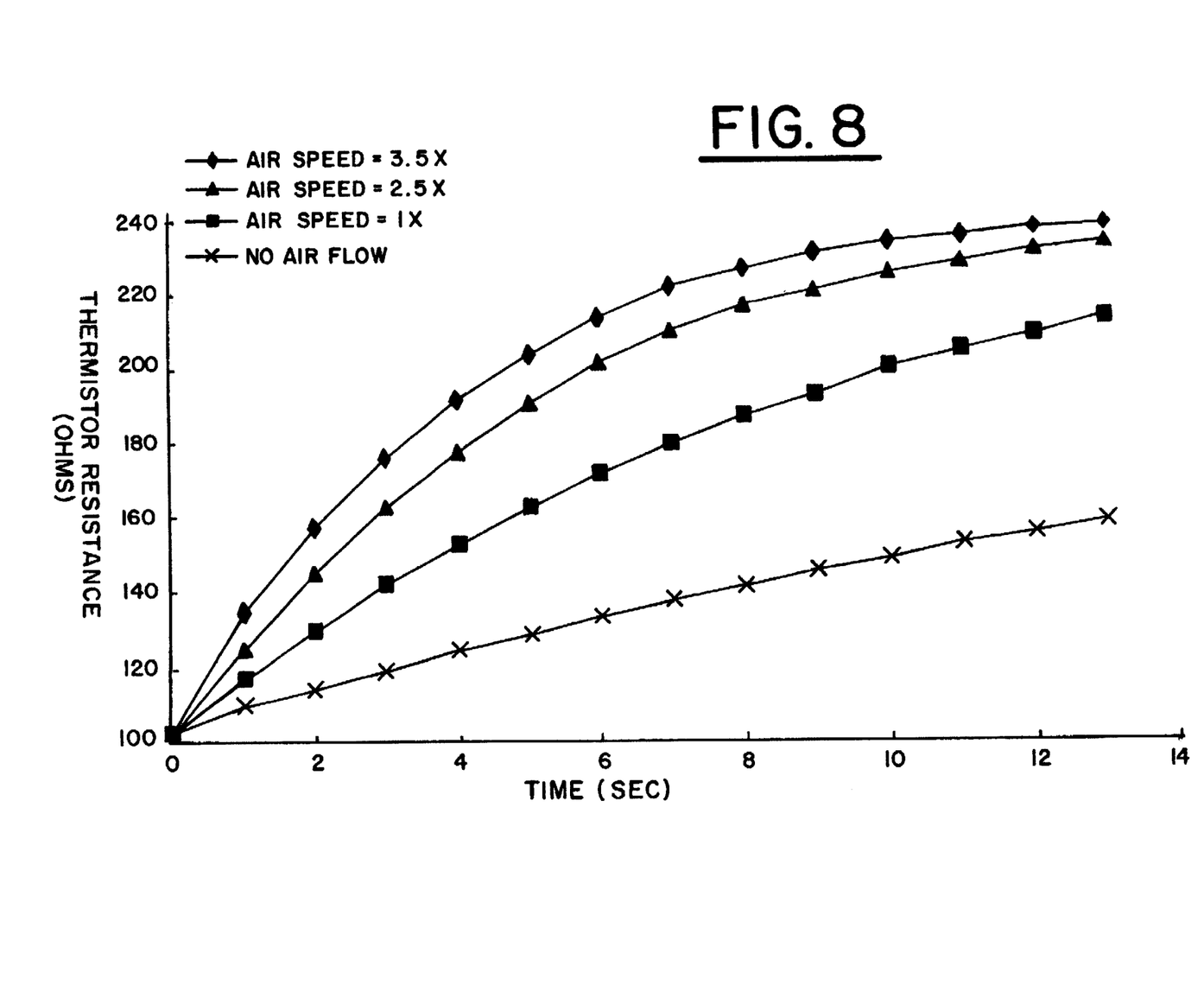
FIG. 8 is a plot showing typical thermistor resistance changes as a function of time with airflow speed as a parameter.

FIG. 8 illustrates the rates of change in the resistance in a negative temperature coefficient thermistor used as said airflow sensor, as a function of the speed of airflow. Curve A shows the resistance change when the airflow speed is zero; curve B represents resistance change for a certain air speed 1× used as a reference; curves C and D show the resistance changes for airflow velocities 2.5× and 3.5×.

Figure 9:
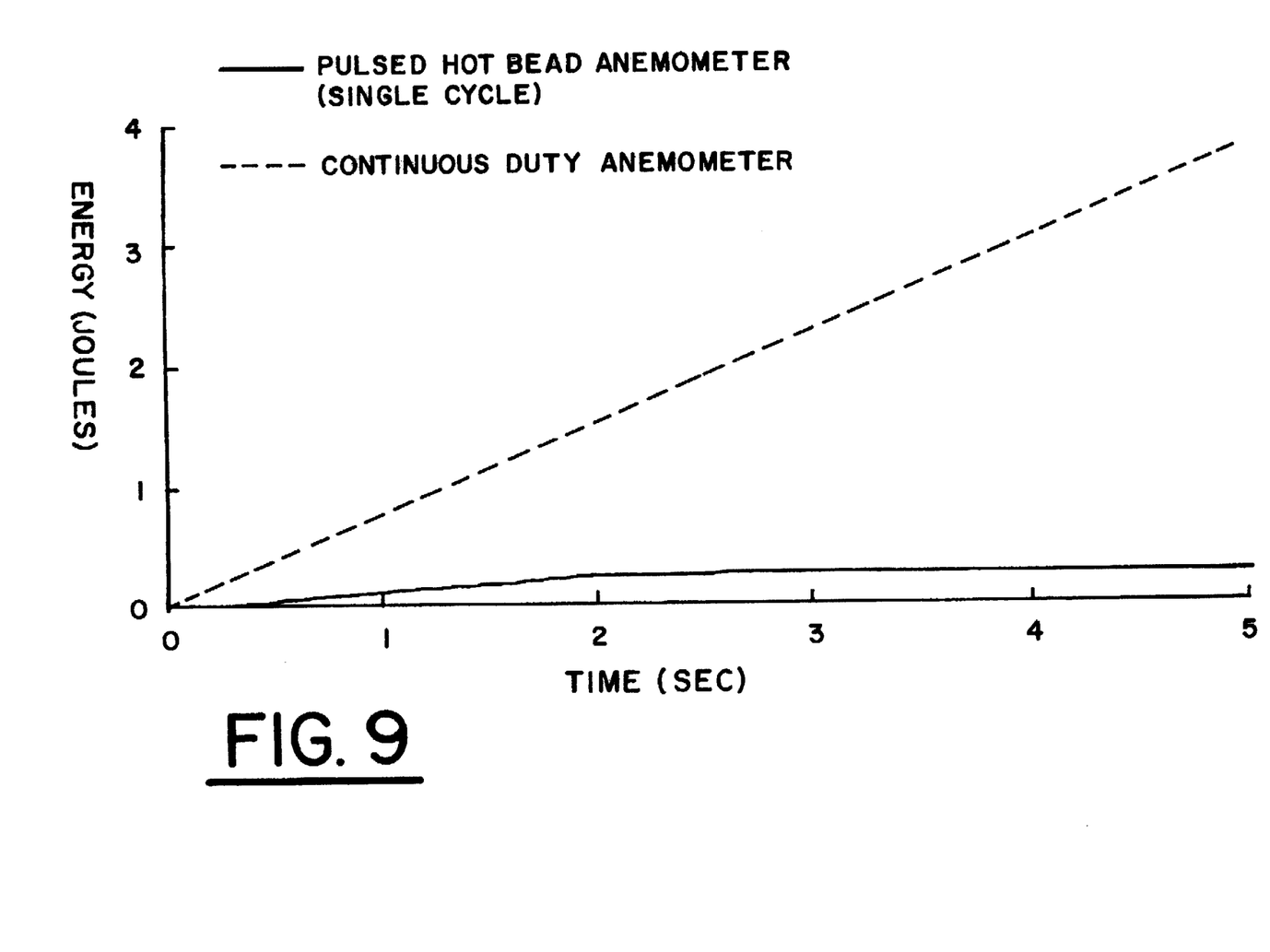
FIG. 9 is another plot showing energy consumption by a cyclic anemometer, according to this invention with a solid line curve vs. continuous consumption by a typical, conventional mode anemometer, shown by the dark line curve.

FIG. 9 shows the significantly reduced energy use by a anemometer according to this invention, vs. a typical conventional heated sensor anemometer.

Figure 10:
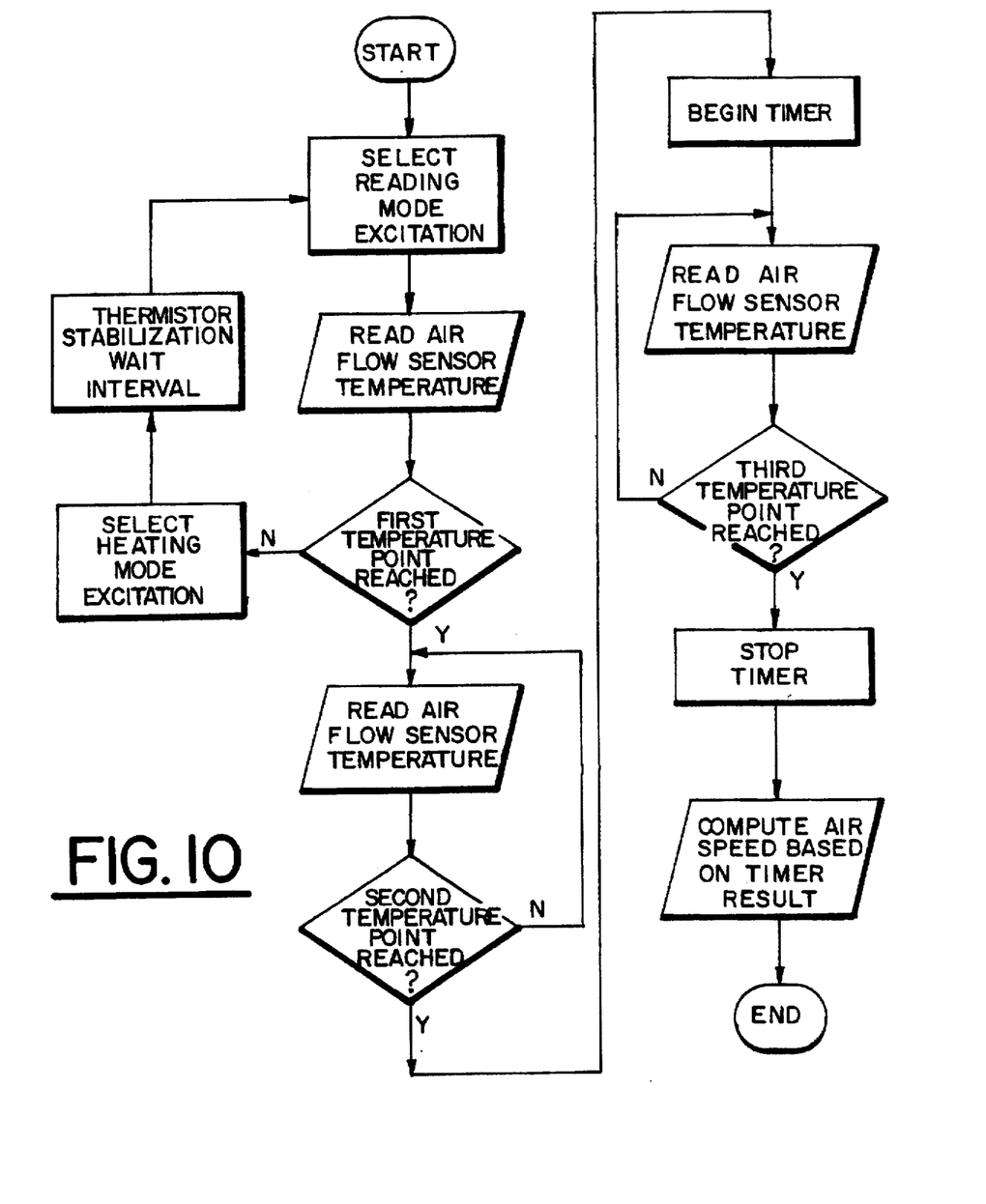
FIG. 10 is a simplified flow diagram depicting the operation of the stored program controlling the function of the anemometer.

Referring to FIG. 10 the program as shown in the flow diagram is best understood with reference to the preceding explanation of the operation of the anemometer.

It is to be understood that the preceding descriptions are illustrative only and that changes can be made in the anemometer, subject of this invention, its components, materials and elements, the sequences of operations and process steps, as well as in all other aspects of this invention discussed herein without departing from the scope of the invention.

We claim:

1. Anemometer for measuring the speed of air flow, operating in a cyclic mode with reduced power requirements, comprising
   (a) a temperature sensor having a single element responsive to air flow omni-directionally with respect to said element, said element also serving as a heater;
   (b) means to generate bursts of duty cycle controllable current pulses over a first period during a measurement cycle to heat said element to a known first temperature;
   (c) means for determining a second period during said cycle during which said element is cooled by said air flow to a second temperature;
   (d) means to detect a third period during said cycle following said second period during which said third period, said element is cooled by said air flow to a third temperature; and
   (e) means responsive to the duration of said third period for determining said air flow speed.

2. Anemometer per claim 1 in which said single temperature sensing element is a thermistor.

3. Anemometer per claim 1 in which said single temperature sensing element is also used to measure the temperature of ambient air, said ambient temperature to serve as a reference for determining the value of said first temperature.

4. Anemometer per claim 1 in which each of said bursts of electric current pulses comprise a plurality of individual pulses of current.

5. Anemometer per claim 4 in which the duty cycles of said pulses of current are adjusted in response to the changing resistance of said sensing elements.

6. Anemometer per claim 5 in which said resistance of said sensing element is measured during the heating period between said bursts of electric current pulses and the results of the measurements are used to control the heating current.

7. Anemometer per claim in 1 which includes means programmable to set the airflow speed range, the frequency of cyclic airflow measurements, to set the values of said first second and third temperature points, and to accommodate device-dependent parameters of said first and second temperature-sensors.

8. Anemometer per claim 1 in which said single temperature sensing element is a wire.

9. Anemometer per claim 1 in which said single temperature sensing element is a thin film.

10. Anemometer per claim 1 wherein said means for detecting said third period comprises a timing circuit which is initiated when said second temperature is reached and stopped when said third temperature is reached.

11. Anemometer per claim 1 wherein said period determining means is operative in response to temperatures above ambient air temperature in the vicinity of said sensing element.

* * * * *